US007333443B2

United States Patent
Beckmann et al.

(10) Patent No.: US 7,333,443 B2
(45) Date of Patent: Feb. 19, 2008

(54) METHOD FOR TRANSMITTING DATA PACKETS VIA A RADIO INTERFACE OF A MOBILE RADIO SYSTEM

(75) Inventors: Mark Beckmann, Braunschweig (DE); Michael Eckert, Braunschweig (DE); Udo Hallmann, Lahstedt (DE); Martin Hans, Hildesheim (DE); Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 884 days.

(21) Appl. No.: 10/398,672

(22) PCT Filed: Oct. 5, 2001

(86) PCT No.: PCT/DE01/03843

§ 371 (c)(1),
(2), (4) Date: Aug. 25, 2003

(87) PCT Pub. No.: WO02/096030

PCT Pub. Date: Nov. 28, 2002

(65) Prior Publication Data

US 2004/0028078 A1 Feb. 12, 2004

(30) Foreign Application Priority Data

Oct. 9, 2000 (DE) ................. 100 49 797

(51) Int. Cl.
H04L 12/28 (2006.01)
(52) U.S. Cl. .............. 370/254; 370/338; 370/469
(58) Field of Classification Search ........ 370/338, 370/254, 255, 469
See application file for complete search history.

(56) References Cited

U.S. PATENT DOCUMENTS

| 6,850,540 B1 * | 2/2005 | Peisa et al. ............ 370/468 |
| 2003/0039236 A1* | 2/2003 | Uga ........................ 370/345 |
| 2006/0140158 A1* | 6/2006 | Terry ....................... 370/335 |

FOREIGN PATENT DOCUMENTS

| WO | WO 99/52307 | 10/1999 |
| WO | WO 00/28760 | 5/2000 |

OTHER PUBLICATIONS

3rd Generation Partnership Project: Technical Specification Group Radio Access Network: Radio Interface Protocol Architecture (3G TS 25.301 Version 3.3.0) Dec. 1999 XP002164238 p. 11, 14 and 27.

* cited by examiner

*Primary Examiner*—Ricky Q. Ngo
*Assistant Examiner*—Pao Sinkantarakorn
(74) *Attorney, Agent, or Firm*—Bell, Boyd & Lloyd LLP

(57) ABSTRACT

Data packets are transmitted via a radio interface, wherein a control unit of a first entity transmits information via its logical channels serving as service access points in the form of a configuration message, with the configuration message including information about which logical channels are to be mapped onto which transport channels serving as service access points for a bit transmission layer. A set of transport formats are predetermined for each of the transport channels along with a set of permitted combinations of transport formats for all transport channels. Each transport format includes a set of parameters determining transmission characteristics of the transport channel configured with the corresponding transport format. The first entity selects a transport format for each of the transport channels, such that the resulting combination of transport formats corresponds to one of the transport combinations defined as permissible and wherein the first entity transmits the data to initiate the transmission of the data packets.

7 Claims, 20 Drawing Sheets

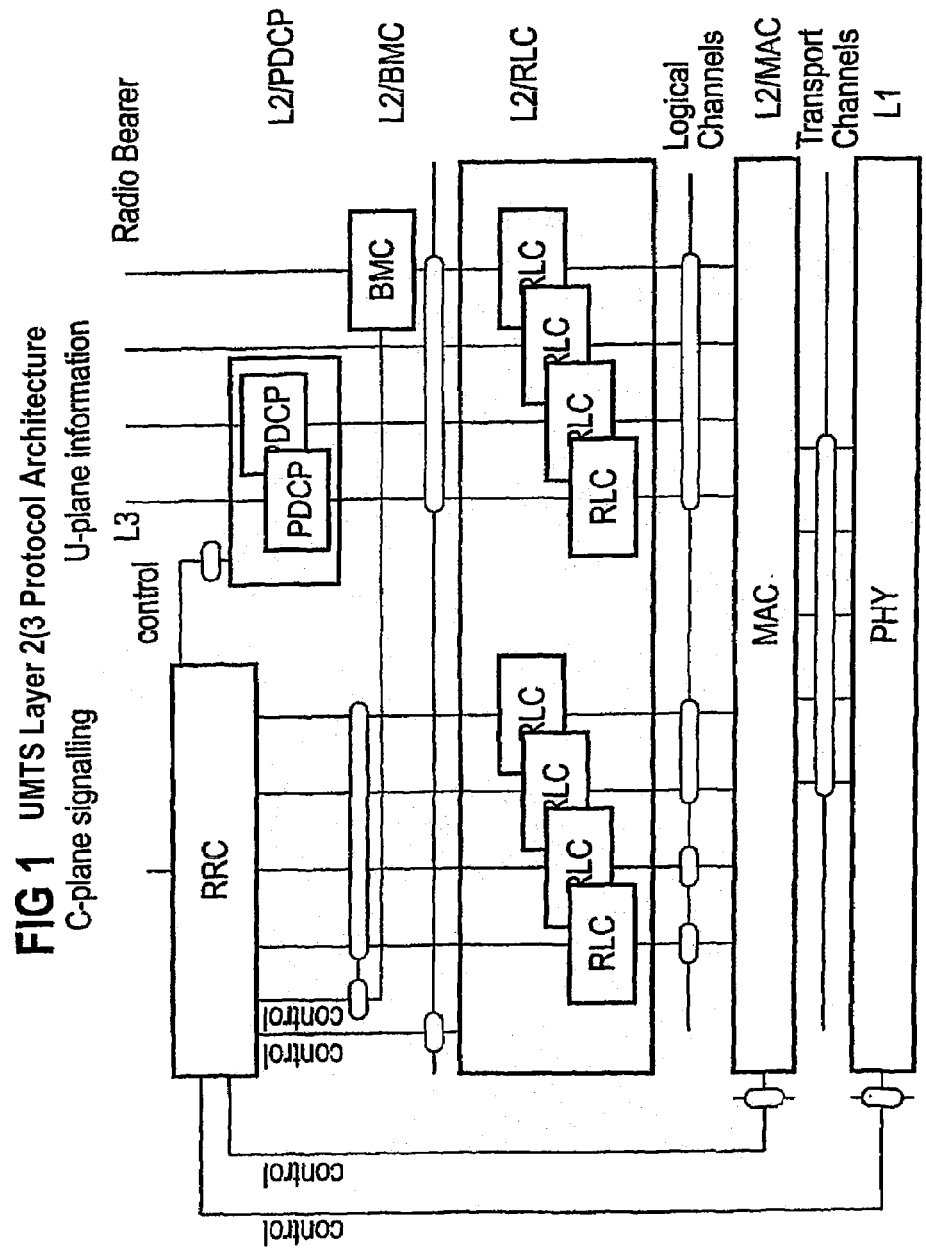
FIG 1  UMTS Layer 2(3 Protocol Architecture

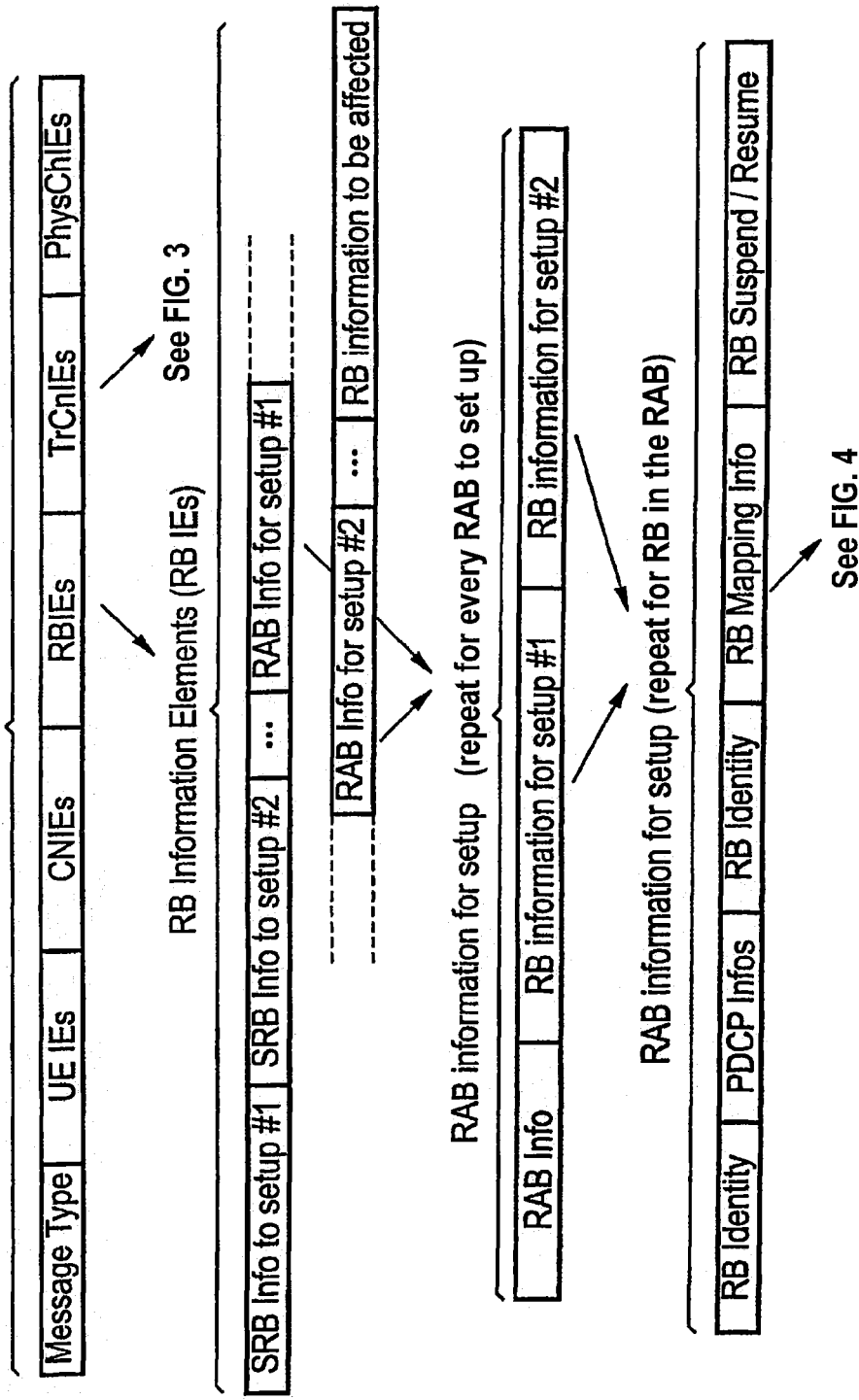
FIG 2  Radio Bearer Reconfiguration Message (Prior Art)

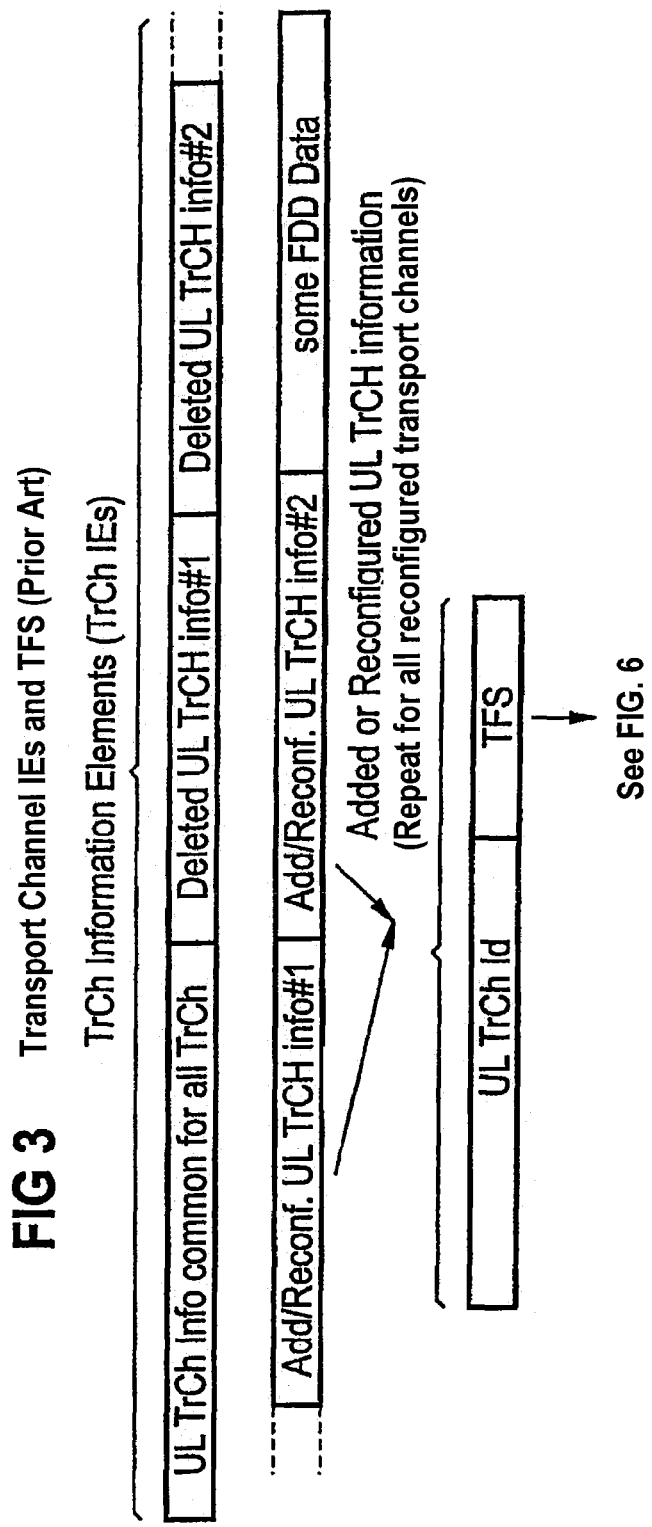
FIG 3  Transport Channel IEs and TFS (Prior Art)

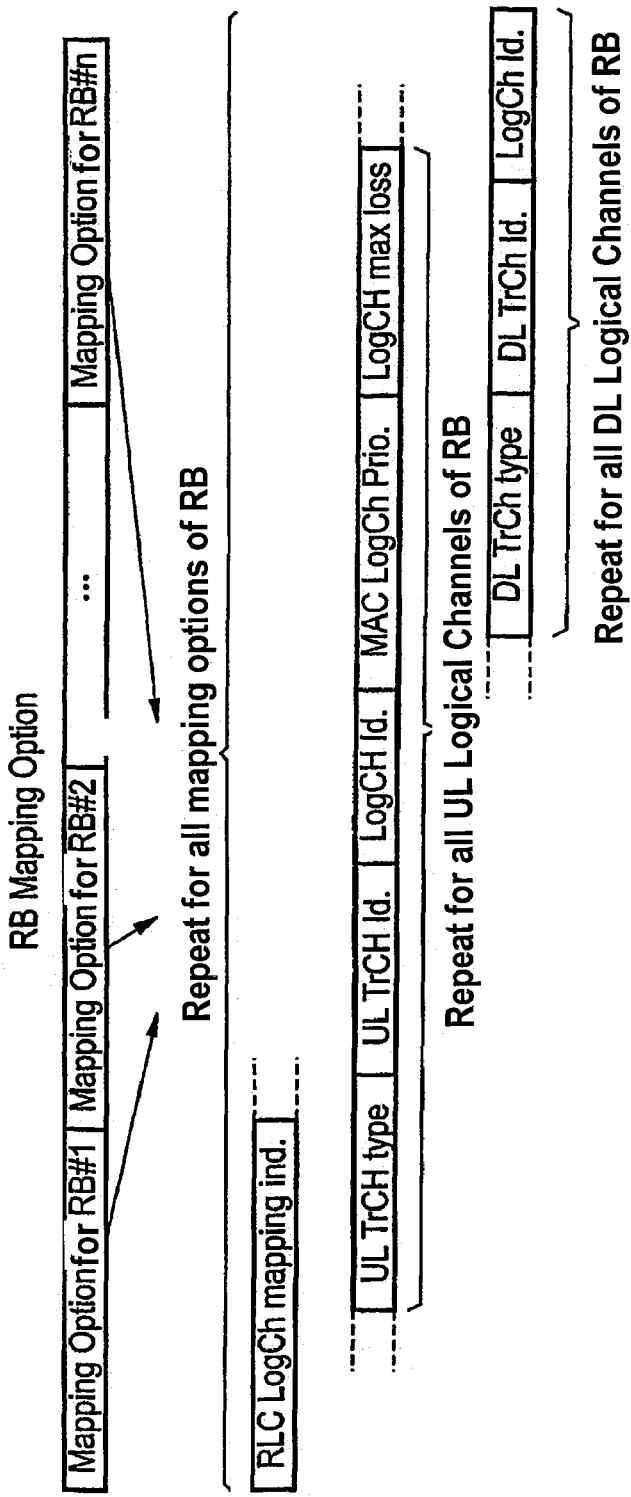
FIG 4   Radio Bearer Mapping Option (Prior Art)

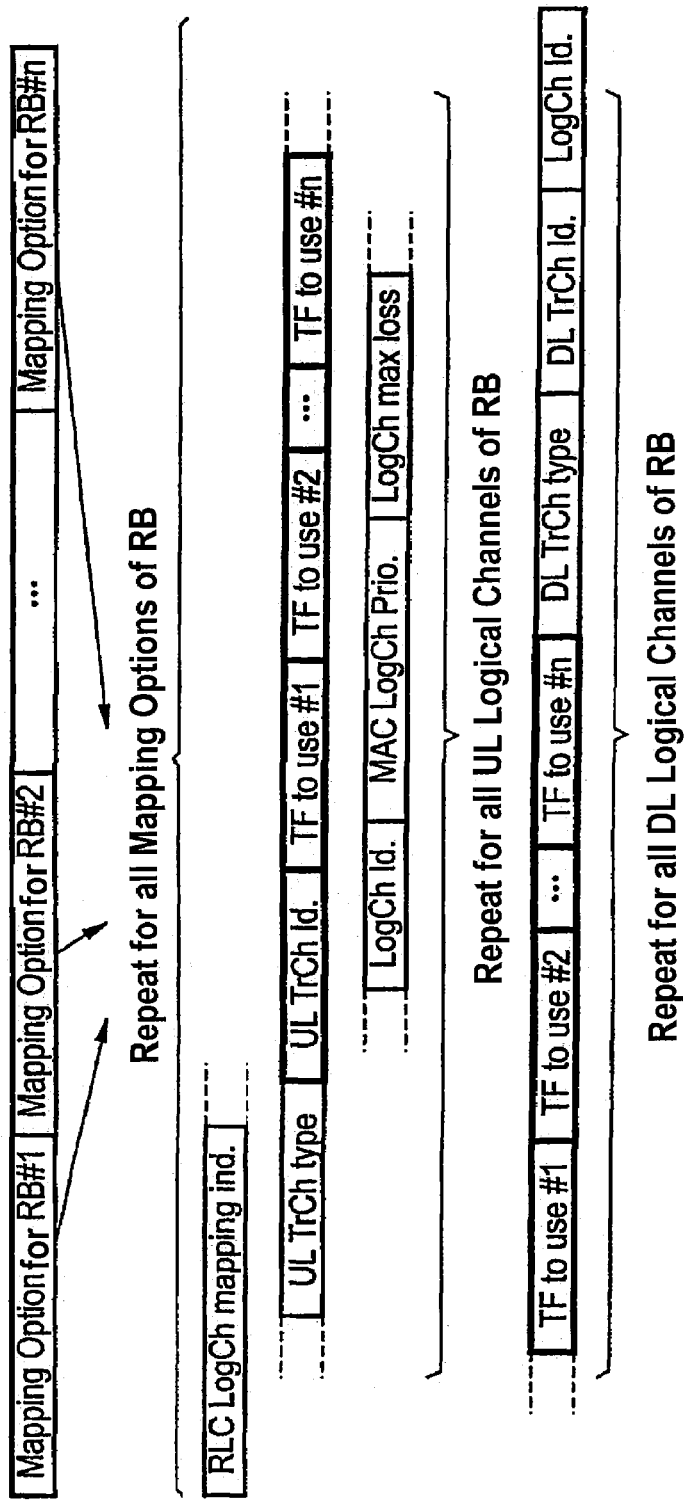
FIG 5  Mapping Option (According to the invention)

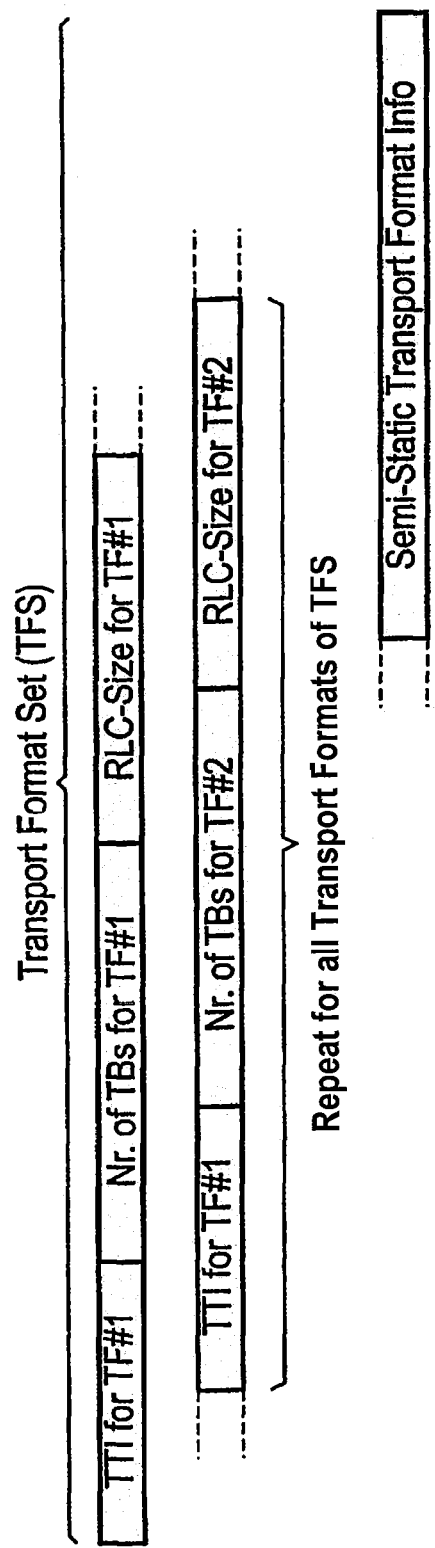
FIG 6 TFS (Prior Art)

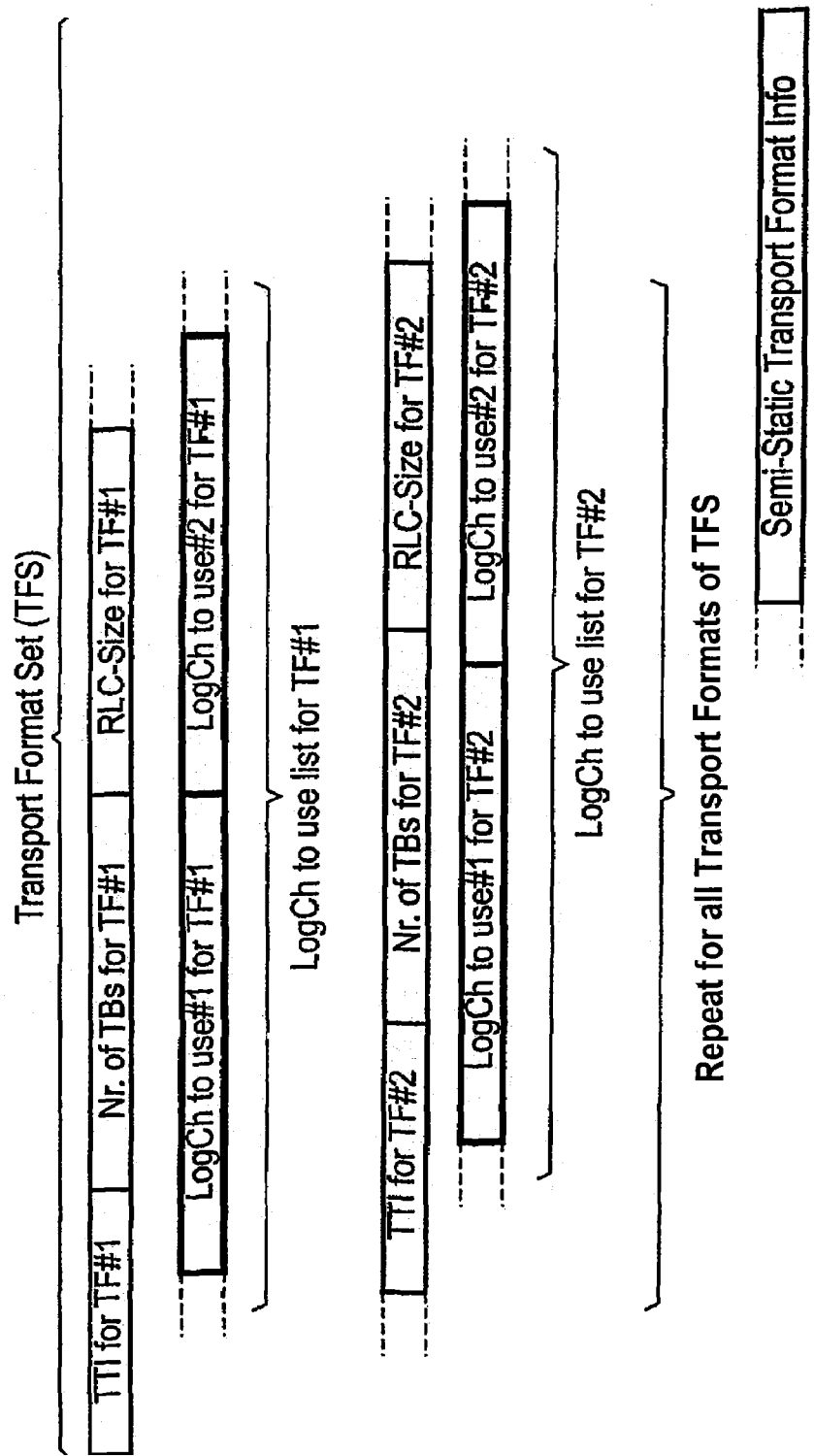
FIG 7  TFS  (According to the invention)

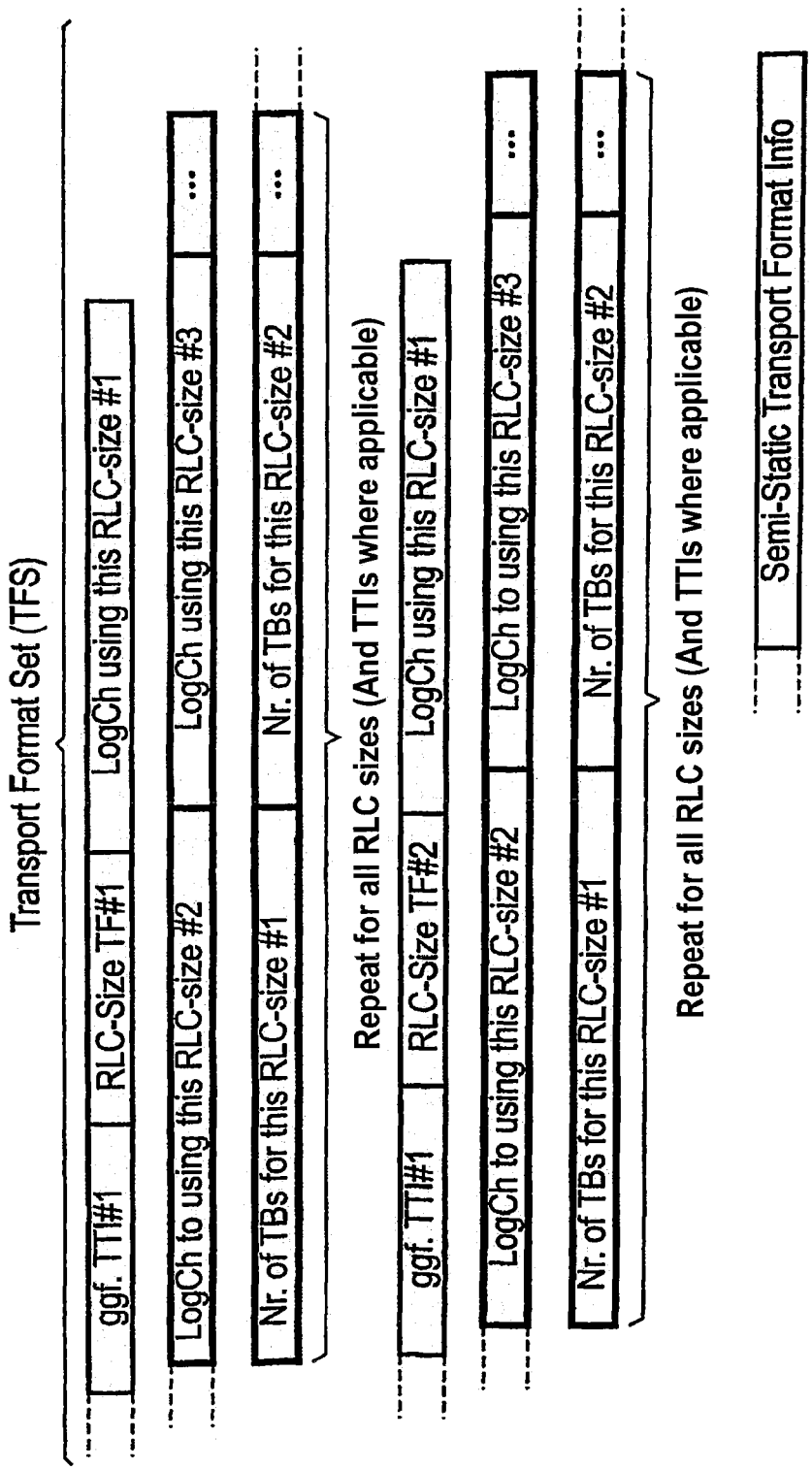
FIG 8  TFS  (According to the invention)

FIG 9A :RB mapping info (Prior Art)

A multiplexing option for each possible transport channel this RB can be multiplexed on

| Information Element/Group name | Need | Multi | Type and reference | Semantics description |
|---|---|---|---|---|
| Information for each multiplexing Option | | 1 to <maxRBM uxOptions> | | |
| >RLC logical channel mapping indicator | CV-UL-RLC Logical Channels | | Boolean | True indicates that the first logical channel shall be used for data PDUs and the second logical channel shall be used for control PDUs. FALSE indicates that control and data PDUs can be sent on either of the two logical channels. |
| >Number of uplink RLC logical channels | CV-UL-RLC info | 1 to MaxLoCHp erRLC | | 1 or 2 channels per RLC entity or radio bearer RLC [TS 25.322] |
| >>Uplink transport channel type | MP | | Enumerated (DPH,RACH, CPCH,USCH) | CPCH is FDD only USCH is TDD only |
| >>UL Transport channel identity | CV-UL-DCH/USC H | | Transport channel identity 10.3.5.18 | CPCH is FDD only USCH is TDD only |

FIG 9B

| | | | | |
|---|---|---|---|---|
| >>Logical channel identity | OP | | | Integer(1...15) | This parameter is used to distinguish logical channels multiplexed by MAC on a transport channel |
| >>MAC Logical channel priority | MP | | | Integer(1...8) | This is priority between a user's different RBs (or logical channels). [25.321] |
| >>Logical channel max loss | MD | | | Integer(0,5,1 0,15,20,25,3 0,35,40,45,5 0,55,60,65,7 0,75,80,85,9 0,95,100) | [SEE 25.321]. Default value is 0. |
| >Number of downlink RLC logical channels | CV-DL-RLC info | 1 to MaxLoCHp erRLC | | | 1 or 2 logical channels per RLC entity or radio bearer RLC [TS 25.322] |
| >>Downlink transport channel link | MPo | | | Enumerated (DCH,FACH, DSCH) | |
| >>DL Transport channel identity | CV-DL-DCH/DSC H | | | Transport channel identity 10.3.5.18 | |
| >>Logical channel identity | OP | | | Integer(1...15) | 16 is reserved |

FIG 9C

| Condition | Explanation |
|---|---|
| UL-RLC info | if "CHOICE Uplink RLC mode" in IE "RLC info" is present this IE is MP. Otherwise the IE is not needed. |
| DL-RLC info | if "CHOICE Downlink RLC mode" in IE "RLC info" is present this IE is MP. Otherwise the IE is not needed. |
| UL-RLCLogicalChannels | if "Number of uplink RLC logical channels" in IE "RB mapping info" is 2, then this is present. Otherwise this IE is not needed. |
| UL-DCH/USCH | if IE "Downlink transport channel type" is equal to "DCH" or "USCH" (TDD only) this IE is MP. Otherwise the IE is not needed. |
| DL-DCH/DSCH | if IE "Downlink transport channel type" is equal to "DCH" or "DSCH" this IE is MP. Otherwise the IE is not needed. |

FIG 10A  Transport Format Set  (Prior Art)

| Information Element/Group name | Need | Multi | Type and reference | Semantics description |
|---|---|---|---|---|
| CHOICE Transport channel type | MP | | | |
| >Dedicated transport channels | MP | | | The transport channel that is configured with this TFS is of type DCH |
| >>Dynamic transport Format Information | MP | 1 to <maxTF> | | The first instance of the parameter Dynamic transport format information correspond to Transport format 0 for this transport channel, the second to transport format 1 and so on. |
| >>>Transmission Time Interval | CV-dynamicTTI | | Integer(10,20,40,80) | ms<br>4 spare values are needed<br>Criticality reject |
| >>>Number of Transport blocks | MP | | Integer(0...512) | Note |
| >>>RLC Size | MP | | Integer(0...49 92) | Unit is bits |
| >>Semi-static Transport Format Information | MP | | Semi-static Transport Format Information 10.3.5.11 | |

FIG 10B

| | | | | |
|---|---|---|---|---|
| >>Common transport channels | | | | The transport channel that is configured with this TFS is of type DCH |
| >>Dynamic transport Format Information | MP | 1 to <maxTF> | | The first instance of the parameter Dynamic transport format information correspond to Transport format 0 for this transport channel, the second to transport format 1 and so on. |
| >>>Number of Transport blocks | MP | | Integer(0...512) | Note |
| >>>RLC Size | MP | | Integer(0...4992) | Unit is bits |
| >>>CHOICEmode | MP | | | |
| >>>>FDD | | | | |
| >>>>TD | | | | (no data) |
| >>>Transmission Time Interval | CV-dynamicTTI | | Integer(10,20,40,80) | ms 4 spare values are needed Criticality reject |
| >>Semi-static Transport Format Information | MP | | Semi-static Transport Format Information 10.3.5.11 | |

| Condition | Explanation |
|---|---|
| dynamicTTI | This IE is not included if dynamic TTI usage is indicated in IE Transmission Time Interval in Semi-Static Transport Format Information. Otherwise it is not needed. |

FIG 11A  RB mapping info according to the invention, Alternative I
(Changes compared to prior art in bold)

A multiplexing option for each possible transport channel this RB can be multiplexed on

| Information Element/Group name | Need | Multi | Type and reference | Semantics description |
|---|---|---|---|---|
| Information for each multiplexing Option | MP | 1 to <maxRBM uxOptions> | | |
| >RLC logical channel mapping indicator | CV-UL-RLC Logical Channels | | Boolean | True indicates that the first logical channel shall be used for data PDUs and the second logical channel shall be used for control PDUs. FALSE indicates that control and data PDUs can be sent on either of the two logical channels. |
| >Number of uplink RLC logical channels | CV-UL-RLC info | 1 to MaxLoCHp erRLC | | 1 or 2 channels per RLC entity or radio bearer RLC [TS 25.322] |
| >>Uplink transport channel type | MP | | Enumerated (DCH,RACH, CPCH,USCH) | CPCH is FDD only USCH is TDD only |
| >>UL Transport channel identity | CV-UL-DCH/USCH | | Transport channel identity 10.3.5.18 | This is the ID of a DCH or USCH(TDD only) that this RB could be mapped onto. |

FIG 11B

| | | | |
|---|---|---|---|
| >>TF to use list | OP | 1 to <maxTF> | Indicates the Transport Formats that may be used for the logical channel. Not present means every TF can be used. |
| >>>TF to use | MP | | TF within the TFS |
| >>Logical channel identity | OP | Integer(1...15) | This parameter is used to distinguish logical channels multiplexed by MAC on a transport channel |
| >>MAC Logical channel priority | MP | Integer(1...8) | This is priority between a user's different RBs (or logical channels). [25.321] |
| >>Logical channel max loss | MD | Integer(0,5,10,15,20,25,30,35,40,45,50,55,60,65,70,75,80,85,90,95,100) | [SEE 25.321]. Default value is 0. |
| >Number of downlink RLC logical channels | CV-DL-RLC info | 1 to MaxLoCHperRLC | 1 or 2 logical channels per RLC entity or radio bearer RLC [TS 25.322] |
| >>Downlink transport channel type | MP | Enumerated (DCH,FACH,DSCH) | |

FIG 11C

| >>DL Transport channel identity | CV-DL-DCH/DSCH | | |
|---|---|---|---|
| >>Logical channel identity | | Transport channel identity 10.3.5.18 | Integer(1...15) |
| | OP | | 16 is reserved |

| Condition | Explanation |
|---|---|
| UL-RLC info | if "CHOICE Uplink RLC mode" in IE "RLC info" is present this IE is MP. Otherwise the IE is not needed. |
| DL-RLC info | if "CHOICE Downlink RLC mode" in IE "RLC info" is present this IE is MP. Otherwise the IE is not needed. |
| UL-RLCLogicalChannels | if "Number of uplink RLC logical channels" in IE "RB mapping info" is 2, then this is present. Otherwise this IE is not needed. |
| UL-DCH/USCH | if IE "Downlink transport channel type" is equal to "DCH" or "USCH" (TDD only) this IE is MP. Otherwise the IE is not needed. |
| DL-DCH/DSCH | if IE "Downlink transport channel type" is equal to "DCH" or "DSCH" this IE is MP. Otherwise the IE is not needed. |

FIG 12A  Transport Format set according to the invention
(Changes compared with prior art in bold)

| Information Element/Group name | Need | Multi | Type and reference | Semantics description |
|---|---|---|---|---|
| CHOICE Transport channel type | MP | | | |
| >Dedicated transport channels | MP | | | The transport channel that is configured with this TFS is of type DCH |
| >>Dynamic transport Format Information | MP | 1 to <maxTF> | | The first instance of the parameter Dynamic transport format information correspond to Transport format 0 for this transport channel, the second to transport format 1 and so on. |
| >>>Transmission Time Interval | CV-dynamicTTI | | Integer(10,2 0,40,80) | ms 4 spare values are needed Criticality reject |
| >>>Number of Transport blocks | MP | | Integer(0...51 2) | Note |
| >>>RLC Size | MP | | Integer(0...49 92) | Unit is bits |

FIG 12B

| | | | |
|---|---|---|---|
| >>>LogCh to use list | OP | 1 to <15> | Indicates the Logical Channels that may use this Transport Format. Not present means every Logical Channel is allowed. |
| >>>>LogCh to use | MP | | Integer(1...1 5) |
| >>Semi-static Transport Format Information | MP | | Semi-static Transport Format Information 10.3.5.11 |

| Condition | Explanation |
|---|---|
| dynamicTTI | This IE is included if dynamic TTI usage is indicated in IE Transmission Time Interval in Semi-Static Transport Format Information. Otherwise it is not needed. |

FIG 12C Transport Format set according to the invention
(Changes compared with prior art in bold)

| Information Element/Group name | Need | Multi | Type and reference | Semantics description |
|---|---|---|---|---|
| CHOICE Transport channel type | MP | | | |
| >Dedicated transport channels | MP | | | The transport channel that is configured with this TFS is of type DCH |
| >>Dynamic transport Format Information | MP | 1 to <maxTF> | | The first instance of the parameter Dynamic transport format information correspond to Transport format 0 for this transport channel, the second to transport format 1 and so on. |
| >>>RLC Size | MP | | Integer(0...49 92) | Unit is bits |
| >>>Number of Transport Blocks List | MP | 1 to <maxBlocks> | | present for every number of Transport Blocks for this RLC-size |
| >>>Number of Transport blocks | MP | | Integer(0...51 2) | Note |
| >>>RLC Size | MP | | Integer(0...49 92) | Unit is bits |

FIG 12D

| | | | |
|---|---|---|---|
| >>>CHOICEmode | MP | | |
| >>>>FDD | | | (no data) |
| >>>>TD | | | |
| >>>Transmission Time Interval | CV-dynamicTTI | Integer(10,2 0,40,80) | ms 4 spare values are needed Criticality reject |
| >>Semi-static Transport Format Information | MP | Semi-static Transport Format Information 10.3.5.11 | |

| Condition | Explanation |
|---|---|
| dynamicTTI | This IE is not included if dynamic TTI usage is indicated in IE Transmission Time Interval in Semi-Static Transport Format Information. Otherwise it is not needed. |

METHOD FOR TRANSMITTING DATA PACKETS VIA A RADIO INTERFACE OF A MOBILE RADIO SYSTEM

BACKGROUND OF THE INVENTION

General

FIG. 1 shows the UMTS protocol architecture of layer 2 and lower layer 3 (for the layer model, see [1]), which contains the protocols of the UMTS radio interface. This architecture exists both in the mobile device (User Equipment, UE) and also in a node of the mobile communication network (Radio Network Controller, RNC); in other words, each of the protocols exists once in the UE and once in the RNC.

The same protocols exchange Protocol Data Units (PDUs), as they use the services of the protocol layers below them for the transport of PDUs. Every protocol layer provides the layer above it with its services at what are known as service access points. To understand the architecture better, these service access points are given commonly used and unique names; e.g., logical channels, transport channels, Radio Bearer. For data transfer, protocols pick up service data units (SDUs) at their service access points and transmit PDUs generated from these to the layer below them, so PDUs from upper layers are identical to the SDUs of the layer below.

The protocol layers shown in FIG. 1 are
the Radio Resource Control (RRC) layer
the Packet Data Convergence Protocol (PDCP) layer
the Broadcast/Multicast Control (BMC) layer
the Radio Link Control (RLC) layer
the Medium Access Control SAC) layer
and the physical layer (PHY).

As the PDCP and BMC layers have no specific significance for this invention disclosure, they are not described in any more detail here. The functions of RRC, RLC and MAC are described briefly and generally below. There follows a more precise description of those functions which should be improved or modified via the present invention.

MODE OF OPERATION OF THE PROTOCOLS

Data from different applications can be generated in the UMTS mobile device (UE). For voice connections, for example, a voice coder generates one or more voice data streams or an HTML browser generates irregular packet data streams. This data is first modified, if required, by higher layer protocols and prepared for data transfer in different networks (e.g. TCP [3] and IP [4]). For transport via the UMTS radio interface this data has to be optimized in the various layer 2 protocols (PDCP, RLC and MAC). The service access point, at which non-UMTS-specific protocols can use the transmission service of the UMTS radio interface, is called Radio Bearer (RB). RBs are therefore supplied above layer 2, depending on the protocols used above PDCP, BMC or RLC, and transmit data transparently from the UE via the UMTS radio interface to the RNC and vice-versa. When setting up such an RB, a predetermined transmission service quality (Quality of Service, QoS) is specified for this transmission and is characterized, for example, by a predetermined guaranteed data rate or a maximum transmission delay. RBs are essentially bi-directional; therefore, an RB can transmit data in two directions (in the Uplink, UL and in the Downlink, DL).

As the data streams of such an RB are either continuous or in packets of any length, it is the task of the RLC protocol to split (or combine) the data stream into packets, which are of an optimal length for the radio interface. Therefore, RLC-SDUs are broken down into RLC-PDUs or a number of RCL-SDUs are merged into RLC-PDUs. The RLC layer also stores the data at an RB in an RLC buffer until it can be transported from layers under RLC via the radio interface. The RLC layer has other tasks (in particular, that of error correction), which are not relevant here however [5]. The RLC layer sends the RLC-PDUs resulting from the split (merger) to the MAC layer for further transmission. The RLC layer is modeled so that there is an independent RLC entity for each Radio Bearer.

The service access points, at which the MAC layer provides its services, are referred to as logical channels. There is precisely one RLC entity per Radio Bearer and either one or two logical channels per direction (UL/DL). Logical channels differ with regard to the nature of the data which is transmitted on them. A distinction is therefore made between logical channels, on which UE-specific useful data, like the above-mentioned voice data streams (Dedicated Traffic Channel, DTCH), UE-specific control data (Dedicated Control Channel, DCCH) or general control data (Common Control Channel, CCCH) is transmitted. A number of DTCHs also can be differentiated by the QoS configured for the corresponding RB.

It is not of primary importance for the transmission of data via the radio interface what is transmitted but how the data is transmitted. Therefore, the physical layer, which contains the data coding, the modulation, the high frequency technology and the antenna, provides service access points for the MAC layer, which are characterized by how the data is transmitted. These are known as transport channels. A distinction is no longer made on the transport channels between useful and control data, a distinction is made, for example, between UE-specific channels (Dedicated Channel, DCH), channels with random access (Random Access Channel, RACH) or channels, the use of which is shared by a number of UEs (Uplink or Downlink Shared Channel, USCH or DSCH).

It is the task of the MAC layer in the sender to map the data at a logical channel above the MAC layer onto the transport channels of the physical layer or to distribute data received in the receiver on transport channels to logical channels. Each transport channel is preconfigured for this purpose with a set of fixed parameters for data transmission. The MAC layer can search in a further set of variable parameters for the most favorable for the current transmission in each instance and can, in this way, influence data transmission dynamically. A valid setting of all parameters for a transport channel is then referred to as the Transport Format (TF). The quantity of all possible settings for a transport channel is referred to as the Transport Format Set (TFS). Only the variable (dynamic) parameters of the TF vary within a TFS. Only one transport format is set for each transport channel at one specific time. The set of transport formats set at one specific time for all available transport channels is referred to as the Transport Set Combination (TFC). The transport formats valid for each transport channels result in a large number of possible combinations for all transport channel and in theory each of these combinations could result in a TFC. In practice, the number of combinations of transport formats actually permitted is restricted. The set of all permitted TFCs is referred to as the Transport Format Combination Set (TFCS).

The RRC protocol is responsible for setting up, removing and reconfiguring transport channels and RBs and for negotiating all parameters of the layer 2 protocols. This protocol also exists in the UE and the RNC and it uses the transmission services provided by the RLC layer, in other words the logical channels, to send RRC messages. The different layer 2 protocols are then configured with the transmission parameters negotiated between the RRC protocols. For example, a TFS is negotiated between the RRC protocols for each transport channel when setting up or reconfiguring and the TFCS valid for all channels is transmitted. Both are then configured in the MAC layer so that MAC can map the logical channels onto the transport channels.

As described above, a transport format includes static parameters, which cannot be influenced by the MAC layer but are negotiated only by RRC and dynamic parameters, from which a set of different settings is negotiated by RRC and which can be influenced by the MAC layer. The static parameters include:

The length of the transmission interval (Transmission Time Interval, TTI), which is the time interval for which the physical layer processes data contiguously. This may be 10, 20, 40 or 80 milliseconds long.

The coding system for error protection.

The length of redundancy information for error protection (CRC, Cyclic Redundancy Check).

The dynamic parameters are:

RLC size. This parameter indicates the RLC-PDU size. As the MAC layer does not generate MAC-PDUs or segment or collate the RLC-PDUs received from RLC, a MAC-PDU always corresponds to just one RLC-PDU. Depending on whether or not the MAC layer prefixes a MAC-PDU with a control data header (MAC header), a MAC-PDU is exactly the size of or the length of a MAC header bigger than the RLC-PDU. These parameters are used to set both the size of the MAC-PDU and the size of the RLC-PDU. The data block transmitted on the transport channel to the physical layer, the MAC-PDU, is also referred to as the transport block.

Number of transport blocks. This parameter determines the number of MAC-PDUs, which may be transmitted during a TTI to the physical layer for simultaneous processing and transmission via the radio interface.

In some cases the TTI also can be a dynamic parameter.

As can be seen, the current data rate of the transport channel, which can be set by the MAC layer dynamically by selecting the different transport formats, in other words by varying the TTI, the RLC size and the Number of Transport Blocks, is determined by the parameters TTI, RLC size and Number of Transport Blocks.

As well as the dynamic selection of a TFC for every transmission interval, the MAC layer has the task of distributing the data coming in on the various RBs to the transport channels taking into account the QoS set for the RB. In this process, what is known as the RB Mapping Info is negotiated by the RRC layer, such as during setting up and reconfiguration of RBs, and this indicates which logical channels are to be mapped onto which transport channels, with the possibility of assigning more than one logical channel to each transport channel.

The sending MAC layer therefore searches for a transport format for each transmission interval and for each transport channel (therefore, one TFC in total) and determines the logical channels from which data can be transmitted in the TTI in question. The MAC layer then informs the corresponding RLC units of the RLC-PDU size associated with the relevant TF and the number of expected RLC-PDUs. RLC then segments the data from the RLC buffer according to the RLC-PDU size and transmits the corresponding number of RCL-PDUs on the corresponding logical channel to the MAC layer. This adds a Mac header to the data, if required, and transmits all the MAC-PDUs for one transport channel simultaneously to the physical layer, which then deals with data transport via the UMTS radio interface within a TTI.

PRIOR ART

The present invention relates to the configuration of data channels for data transmission via a radio interface of a mobile radio system, in particular UMTS, from a mobile station (UE) to a node in the mobile radio system, in particular a Radio Network Controller (RNC).

In the description of the data transmission below, a distinction is made where necessary between a sender and a receiver unit, with both UE and RNC having the capacity to undertake both the role of sender and the role of receiver. During the exchange of configuration data there is essentially one configuring unit, which determines the configuration parameters and which serves as the sender unit for configuration messages, and one configured unit, which accepts the configuration parameters and serves as the receiver unit for configuration messages. In UMTS, the RNC is essentially the configuring unit and the UE is the configured unit. The receipt of configuration messages with configuration parameters can be acknowledged by the return of receipt confirmation messages from the UE to the RNC, with these messages containing values which are different from the parameters received in the UE if necessary.

Useful data exists in the sender unit in the form of continuous data streams or packet data streams, which are generated by different applications or received at corresponding interfaces from a different unit and, where necessary, handled by different protocols; in particular, being segmented or merged into bigger packets. These data streams are transmitted at service access points, known as the logical channels, to the MAC protocol specified in [6], which provides the service of transmitting the data streams via the UMTS radio interface.

The physical layer described in [8], which contains among others the functionalities of antenna, high frequency technology, modulation and data coding, provides the service of transmitting data packets within transmission intervals at its service access points, known as transport channels. The size and number of the data packets, which are transmitted within a transmission interval, here create the length of the transmission interval and the coding used on the data creates a set of parameters, which characterize each transport channel at one time and is hereafter referred to as the Transport Format (TF).

It is the task of the MAC layer to distribute the data packets at the logical channels to the available transport channels and in this process to select an appropriate transport format for each transmission interval and for each transport channel from a predetermined quantity of transport formats, known as the Transport Format Set (TFS). The nature of the distribution of the different logical channels to the available transport channels is restricted here by a table, known as the RB mapping info, which clearly assigns to each logical channel those transport channels which can be used for a transmission. See, for example, FIGS. 9A, B and C.

The setting up, reconfiguration and removal of logical channels and transport channels and the negotiation of the RB mapping info required by the MAC layer and the TFSs of the individual transport channels are carried out by the RRC protocol specified in [7]. For this purpose, the RRC protocol in the RNC decides for each transport channel on the selection of the parameters for each individual TF and the number of TFs within a TFS and on the RB mapping info and collates this in a configuration message or a reconfiguration message with other information. This message is then sent by the RNC to the UE and fed there to the RRC protocol. The parameters contained in this are then transmitted to the MAC layer. (The MAC layer in the RNC can be configured directly by the RRC layer in the RNC).

The RRC (re)configuration message can exist in different forms; for example, as RADIO BEARER RECONFIGURATION, RADIO BEARER SETUP or TRANSPORT CHANNEL RECONFIGURATION. FIGS. 2 (and 3) shows a diagram of the RADIO BEARER SETUP message described in [7]. In these messages the RB mapping option, which assigns a transport channel to a logical channel for each mapping option, and the TFSs of the different transport channels, which contain a list of valid TFs with the dynamic and semi-static parameters (see FIG. 6), are indicated independently of each other.

The RB mapping option is shown, for example, in FIG. 4. As can be seen in the example shown there, a Multiplexing Option for a specific Radio Bearer includes the following indications per direction (Uplink, UL, and Downlink, DL) and per logical channel used by this RB:

Transport channel types ("TrCh type").

ID number of the transport channel onto which the logical channel is to be mapped for the option (Tr).

ID number of the logical channel unique to this transport channel (LogChId).

For the UL prioritization, information for the logical channel in respect of the other logical channels mapped onto this transport channel and an indication of the maximum data rate loss to the benefit of other logical channels (MAC LogCh Prio.

or LogCh max loss).

The unique tabular representation of the RB mapping info is shown in Table 1[7]. The rows show the different elements of the IE and the first column shows the name of the element and, where necessary, a hierarchical breakdown of the element using the symbol ">". The second column gives an indication of whether the element has to be present (MP="Mandatory Present", OP="Optional", CV X="Conditional Value", i.e. dependent on X, with X defined below the table). The third column, where necessary, gives an indication of the multiple presence of the element and the other columns contain further information. The indication "OP" means that in a bit representation the IE first starts with the information which indicates whether further information is present for this element. As this information can, for example, be represented by a single bit, optional information elements can save transmission bandwidth if the information is not present.

The first row in Table I therefore signifies that all the elements below in the table, indented with at least one ">" are repeated as frequently as this first element indicates (in this case, a value between 1 and 8). The second row signifies that all elements indented with ">>" are repeated either once or twice, depending on whether the RB in question uses one or two logical channels for the UL. Rows 3-6 contain the above-mentioned IEs, which constitute the actual RB mapping info. The information in rows 3-5 is then repeated for the DL transport channels.

The tabular representation of the TFS is shown similarly in Table 2[7]. In the first row a distinction is made between Dedicated Transport Channels and Common Transport Channels by making a selection ("CHOICE"). The Dynamic Transport Format Information, including RLC size, number of Transport Blocks (and, where applicable, TTI), is then listed and is repeated for each transport format with different values. As the Semi-Static Transport Format Information for the various transport formats does not vary within a TFS, it is only indicated once. See, for example, FIGS. 10A and B.

SUMMARY OF THE INVENTION

The basis of the present invention is the extension of RRC (re)configuration messages with the purpose of restricting the logical channels to be configured in such a manner that they can only use predetermined transport formats contained in the (re)configuration message, thereby suspending the independence of the RB mapping info from the indication of the TFSs by adding in an extension of the corresponding RRC messages a correlation between the transport formats and the logical channels, with the corresponding logical channels naturally having to be configured for a mapping onto the corresponding transport channel. Particularly, the logical channels are restricted to the use of predetermined values of the parameter RLC size.

An advantage of the present invention is that the RNC is able to configure the data transmission of a number of data streams so that they are transmitted via the same transport channel and each data stream can, nevertheless, be assigned its own transport format; in particular, its own RLC size.

It is particularly advantageous that a set of "semi-static" parameters is equal to all the data streams, which are transmitted via a transport channel, the transport formats of which are therefore part of the same TFS. Data streams with the same requirements with regard to coding type and redundancy data length are, therefore, transmitted via the same transport channel.

It is also particularly advantageous that with this method the parameters of data block size and their number within a transmission interval and, where applicable, the length of the transmission interval between the logical channels can differ between the logical channels, which are transmitted via a transport channel. As the current data rate is determined by the combination of these parameters, the data rate of each individual logical channel can be predetermined with maximum efficiency.

This variation in data rates per logical channel means that irregular data streams, in particular, can be transmitted efficiently via the UMTS radio interface, which is a further advantage of the invention.

The particularly advantageous restriction of the use of the parameter RLC size to predetermined logical channels has the particular advantage that the number of RLC-PDUs of a logical channel transmitted during a TTI can be influenced by the MAC protocol, while the RLC size used in the process for each logical channel is fixed.

Additional features and advantages of the present invention are described in, and will be apparent from, the following Detailed Description of the Invention and the Figures.

BRIEF DESCRIPTION OF THE FIGURES

FIG. 1 shows the UMTS protocol architecture of layer 2 and lower layer 3, which contains the protocols of the UMTS radio interface.

FIG. 2 shows a diagram of a Radio Bearer Reconfiguration message known in the prior art.

FIG. 3 shows a diagram of Transport Channel IEs and TFS known in the prior art.

FIG. 4 shows a Radio Bearer Mapping Option known in the prior art.

FIG. 5 shows a Radio Bearer Mapping Option according to the present invention.

FIG. 6 shows a TFS known in the prior art.

FIG. 7 shows a diagram of a TFS according to the present invention.

FIG. 8 shows an alternative TFS in accordance with the present invention.

FIGS. 9A, B and C show RB mapping information known in the prior art.

FIGS. 10A and B show a diagram of a Transport Format Set known in the prior art.

FIGS. 11A, B and C show a diagram of RB mapping information according to the present invention.

FIGS. 12A, B, C and D show a diagram of a Transport Format Set according to the present invention.

DETAILED DESCRIPTION OF THE INVENTION

Essentially, there are three options for extending the RRC (re)configuration messages as described above:

1. By extending the RB mapping info. Each Mapping option must then be extended for the purpose of indicating one or more transport formats from the TFS of the transport channel, onto which the logical channel is mapped.

2. By extending the TFS. Each transport format within a TFS must then be extended with the purpose of indicating one or more logical channels from the set of logical channels which are mapped into the relevant transport channel.

3. By extending the RRC (re)configuration messages regardless of the existing information elements (IEs) RB mapping info and TFS. An indication of the valid transport formats from the TFS then must be added to the message for every valid combination of logical channel and transport channel.

Extension of the RB Mapping Info

In order to extend the RB mapping info expediently according to the present invention, a list of transport formats also must be indicated for every logical channel to which a transport channel is assigned in the IE, these transport formats being defined in the TFS of the relevant transport channel and to be used for the logical channel.

Extension of the RB mapping info is particularly advantageous, as reconfiguration of the assignment of transport formats to logical channels is particularly simple and efficient in those RRC messages, in which the RB mapping info already exists for other reconfigurations.

It is expedient for the additional IE, here given the name "TF to use list", to be indicated for every logical channel on the same hierarchical level as the Transport Channel Identity.

Essentially, the existence of the information element could be required as mandatory, but it is particularly advantageous to make the IE optional and to specify that, if it is not present, all transport formats can be used by the logical channel. This has the advantage that if there is only one TF in the TFS, or all TFs are to be used by the logical channel, no unnecessary data has to be sent.

Referring to FIGS. 11A, B and C, a further option would be to list those logical channels first in the RB mapping info, which can use all the transport formats of the relevant transport channel and then as an option indicate a further list of logical channels with the TF to use list. This method would be particularly advantageous, as superfluous information (information giving the available/not available option) does not have to be transmitted for all logical channels, which can use all the transport formats of the relevant transport channel. Similarly, the presence of the IE TF to use list can be mandatory, and information giving the option then does not have to be transmitted either. As the first-mentioned method is easier to integrate into UMTS, only this method is shown in the drawing.

The dynamic transport format information is indicated sequentially within a TFS for the transport format 0, 1, etc. It is, therefore, simple within the new IE "TF to use list" to produce a list of indices, in which each integer refers to a transport format within the TFS.

A diagram of the IE RB mapping info extended according to the present invention and the resulting tabular representation are shown in FIG. 5 and Tables 3 for the different options disclosed here.

Extension of the TFS

In order to extend the TFS according to the present invention, a list of logical channels, which can use this transport format, must be indicated for every transport format; in other words, for every incidence of the IE "Dynamic Transport Format Information".

Extension of the TFS is particularly advantageous, as reconfiguration of the assignment of transport formats to logical channels is particularly simple and efficient in those RRC messages in which the TFS already exists for other reconfigurations in the message.

It is expedient for the additional IE, here given the name "LogCh to use list", to be indicated for every transport format, in other words as a new IE in the "Dynamic Transport Format Information" on the same hierarchical level as the IE RLC-size.

Essentially, the existence of the information element could be required as mandatory but it is particularly advantageous to make the IE optional and to specify that, if it is not present, all logical channels can use this transport format. This has the particular advantage that, if there is only one logical channel on this transport channel or all the logical channels should be able to use the TF, no unnecessary data has to be sent.

Referring to FIGS. 12A, B and C, a further option would be to list those transport formats first within the TFS, which are the same for all the logical channels and then as an option indicate a further list of transport formats with the LogCh to use list. This method would be particularly advantageous, as superfluous information (information giving the available/not available option), does not have to be transmitted for all transport formats, which can be used by all the logical channels. Similarly, the presence of the IE LogCh to use list can be mandatory, and information giving the option then does not have to be transmitted either. As the first-mentioned method is easier to integrate into UMTS, only this method is shown in the drawing.

Within the RB mapping info, unique Logical Channel Identities are issued for every logical channel for every transport channel onto which it can be mapped. Within the new IE "LogCh to use list" it is therefore simple to produce a list of Logical Channel Identities, in which each entry uniquely identifies a logical channel, which can use the relevant TF.

A diagram of the IE TFS extended according to the present invention and the resulting tabular representation are shown in FIG. 7 and Tables 4 for the different options disclosed here.

Extension of the TFS by the Restriction of RLC Size

In order to extend the TFS for the particularly advantageous restriction of the parameter RLC size for predetermined logical channels, the following efficient structure of the TFS within an RRC (re)configuration message is proposed.

Within the TFS, in the indication of the "Dynamic Transport Format Information", the transport formats with the same RLC size are indicated together in addition to the existing TTI, where appropriate. For this purpose RLC size and Number of Transport Blocks are not listed for every transport format as in the prior art but each RLC size is listed together with a list of the parameters Number of Transport Blocks and an optional list according to the present invention of the logical channels using this RLC size. This embodiment is shown in diagram form in FIG. 8 and in table form in Table 5.

This embodiment has the advantage that a list of logical channels can be assigned to every characteristic of the parameter RLC size and that the data transmission for these channels can, therefore, be influenced efficiently.

A further advantage is that with this embodiment the parameter Number of Transport Blocks is not restricted for the logical channels and that the MAC protocol can dynamically influence the number of RCL-PDUs transmitted by a logical channel per TTI and adjust it on the basis of the currently available transmission resources.

A further advantage of this embodiment is that even without restriction of the assignment of logical channels to the RLC size parameter, the "sorting" of transport formats on the basis of RLC size and listing of the characteristics of the parameter Numbers of Transport Blocks, savings are made on the data to be transmitted compared with the prior art.

This method is considered to be the most efficient and favorable for UMTS particularly.

Independent Extension

In order to extend an RRC (re)configuration message according to the present invention independently of other IEs, it is necessary to add a list of assignments of logical channels to the transport channels and transport formats.

This extension is particularly advantageous, because it does not require the presence of the IEs RB mapping info or TFS and efficient transmissions can, therefore, take place without these IEs.

It is expedient for the additional IE to be added either directly to the RRC (re)configuration message or to an IE contained in this; e.g., "RB Info to reconfigure". The new IE either includes an enumeration of the transport channels and their transport formats and assignment to the IEs Logical Channel Identifier issued in the RB mapping info or an enumeration of the RB identities and the logical channels used by the RBs and assignment to transport channels and the corresponding transport formats.

As this method is very similar to the previous two, but its application in UMTS is deemed to be less efficient than these methods, no separate drawing or table is shown here.

Combination of Methods

A combination of the above methods is particularly advantageous, in other words, extensions are made to both the RB mapping info and the TFS and possibly also an independent indication is given of the assignment of logical channel to transport format.

This has the particular advantage of allowing very efficient transmission of assignment data in all RRC (re) configuration messages.

Although the present invention has been described with reference to specific embodiments, those of skill in the art will recognize that changes may be made thereto without departing from the spirit and scope of the present invention as set forth in the hereafter appended claims.

REFERENCES

[1] Mobilfunknetze und ihre Protokolle (Mobile radio networks and their protocols), p. 66. B. Walke, Teubner 2000
[3] RFC 0783 Transmission Control Protocol (TCP), IETF, September 1981
[4] RFC 0791 Internet Protocol (IP), IETF, September 1981
[5] TS 25.322 Radio Link Control, 3GPP, June 2000
[6] TS 25.321 Medium Access Control, 3GPP, June 2000
[7] TS 25.331 Radio Resource Control, 3GPP, June 2000
[8] TS 25.302 Services Provided by Physical Layer, 3GPP, June 2000

The invention claimed is:

1. A method for transmitting data packets via a radio interface of a mobile radio system, the method comprising the steps of:
    transmitting information, by a controlled unit of a first entity secondary to the control unit in a data link layer, via logical channels of the control unit serving as service access points, the information formed as a configuration message, wherein the configuration message includes information indicating which logical channels are to be mapped onto which transport channels serving as service access points for a bit transmission layer, indicating which set of transport formats predetermined for each of the transport channels and a set of permitted combinations of transport formats for all transport channels, with each transport format having a set of parameters determining transmission characteristics of the transport channel configured with the corresponding transport format, and indicating which one of transport formats are permitted for each logical channel and a value is predetermined as fixed for at least one of the parameters from the parameter set for transport formats for one of one logical channel, a plurality of logical channels and all logical channels;
    selecting a transport format, via the first entity, for each of the transport channels taking into account an assignment defined in the configuration message of one of transport formats to logical channels and the parameter value predetermined for each of the logical channels, such that a resulting combination of transport formats corresponds to one of the transport combinations defined as permissible; and
    transmitting the data packets, via the first entity, at the logical channels to the transport channels of a bit transmission layer assigned to each of the logical channels by the configuration message and initiating the transmission of the data packets via the radio interface.

2. The method for transmitting data packets via the radio interface of the mobile radio system as claimed in claim 1, wherein the set of parameters creating a transport format includes a first group of static parameters predetermined by the control unit and a second group of variable parameters which can be influenced by the first entity.

3. The method for transmitting data packets via the radio interface of the mobile radio system as claimed in claim 2, wherein a length of a transmission interval within which the bit transmission layer can process data contiguously serves as a parameter which is one of static and variable.

4. The method for transmitting data packets via the radio interface of the mobile radio system as claimed in claim 2, wherein the variable parameters include one of a size and a length of the data blocks transmitted to the transport channels of the first entity, as well as a member of the data blocks.

5. The method for transmitting data packets via the radio interface of the mobile radio system as claimed in claim 1, the method further comprising the step of generating data packets from the data stream, via a second entity in the data link layer, at a service access point for a bearer service upon a request of the first entity and transmitting the data packets to the assigned logical channels.

6. The method for transmitting data packets via a radio interface of the mobile radio system as claimed in claim 5, wherein the second entity buffers the data stream fed in via the service access point.

7. The method for transmitting data packets via the radio interface of the mobile radio system as claimed in claim 5, wherein a length and a number of the data packets generated by the second entity correspond to a length and a number of the data blocks transmitted to the transport channels by the first entity.

* * * * *